United States Patent

Welter et al.

[15] 3,674,860

[45] July 4, 1972

[54] ANAPLASMOSIS VACCINES

[72] Inventors: Clarence J. Welter, Des Moines, Iowa; Miodrag Ristic, Urbana, Ill.

[73] Assignee: Diamond Laboratories, Inc., Des Moines, Iowa

[22] Filed: July 14, 1969

[21] Appl. No.: 841,597

Related U.S. Application Data

[63] Continuation-in-part of Ser. No. 576,545, Sept. 1, 1966, abandoned.

[52] U.S. Cl. ............................................................424/88
[51] Int. Cl. .........................................................A61k 23/00
[58] Field of Search.....................................424/88; 195/1.2

[56] References Cited

UNITED STATES PATENTS 3,511,908   5/1970   Brock et al. ..............................424/88

OTHER PUBLICATIONS

Edds, et al., Proc. 68th Mtg. U.S. Livestock Sanitary Ass'n pp. 102–111 (Oct. 1964) " Irradiation of Anaplasma Marginale for Vaccine Production."

Brock, et al., O.S.U. Exp. Sta. Tech. Bulletin T– 11 (June 1965) pp. 1– 13, " A Vaccine For Anaplasmosis."

Edds, et al., U. Fla. Agr. Exp. Sta. Ann. Rpt. (1965) p. 205 " Anaplasmosis of Cattle."

Pearson Proc. 69th Mtg. U.S. Livestock Sanitary Ass' n. pp. 111– 112 (Oct. 1965) " Control of Anaplasmosis by Vaccination."

*Primary Examiner*—Shep K. Rose
*Attorney*—Cushman, Darby & Cushman

[57]   ABSTRACT

An anaplasmosis vaccine containing an avirulent Anaplasma marginale mutant in a red blood cell carrier is provided. The virulent form is exposed to radiation to accelerate the rate of dissociation of the virulent form to an avirulent form and the irradiated organism is subsequently passed through at least one nonbovine ruminant host.

14 Claims, No Drawings

ANAPLASMOSIS VACCINES

This application is a continuation-in-part of prior copending application Ser. No. 576,545 filed Sept. 1, 1966, now abandoned.

This invention relates to the modification of Anaplasma marginale, a blood pathogen of cattle, through its propagation in nonbovine hosts. More particularly, the invention relates to the production of an attenuated anaplasmosis vaccine comprising the modified Anaplasma marginale organism useful for the prevention of the economically important clinical anaplasmosis.

Bovine anaplasmosis is a blood disease manifested by progressive anemia associated with the presence of intraerythrocytic inclusions designated as Anaplasma marginale. The disease produces severe economic losses to the cattle industry in the United States and throughout the tropical and subtropical regions of the world. A comprehensive review on anaplasmosis, including the pathogenesis of the disease and the ethiology of the causative agent, has been published (Ristic, Miodrag. Advances in Veterinary Science, Vol. 6, 1960: 111–191

To date, no attenuated Anaplasma marginale vaccine has been available for protecting cattle against anaplasmosis. Theiler preimmunized cattle in Africa by using Anaplasma centrale which, in susceptible animals, produced a mild reaction and induced an immunity apparently sufficient to protect against the disease caused by infection with Anaplasma marginale (Theiler, A., Z Infectionkrankh. Parasit. Krankh. u. Hyg. Houstiere Vol. II, 1912: 193–207). However, Anaplasma centrale is too virulent for normal use in cattle and is not serologically identical to Anaplasma marginale. There is no report of occurrence of Anaplasma centrale in the United States.

It is, therefore, an object of the present invention to provide an anaplasmosis vaccine which is useful for the prevention of certain economically important anaplasmosis.

It is a further object of the invention to provide a process for the preparation of said anaplasmosis vaccine.

Still other objects can be gathered from the following specification and appended claims.

The present invention contemplates three conditions for the production of an attenuated Anaplasma vaccine. These steps are referred to as: (1) Attenuation of Anaplasma marginale; (2) demonstration of immunogenicity of the attenuated organism and (3) preparation of vaccines suited for use in the field.

The manner in which the three steps of the present invention are to be carried out is described in greater detail in reference to the following specific experiments. It is to be understood that these experiments, while indicating preferred embodiments of the invention, are given by way of illustration only, since various changes and modifications within the spirit and scope of the invention will become apparent to those skilled in the art from this detailed description.

EXAMPLE 1 ATTENUATION OF ANAPLASMA MARGINALE

In accordance with the present invention, the method for the attenuation of Anaplasma marginale is as follows: (1) Acceleration of the rate of dissociation of a virulent Anaplasma marginale by exposure to X-ray irradiation and (2) preparation of an avirulent Anaplasma marginale mutant by serial passages of irradiated organisms in nonbovine ruminants such as deer, sheep and goats. The following series of experiments demonstrate this method.

Ten ml. of blood, with 70 percent of its erythrocytes parasitized, obtained from an experimentally infected calf, was first exposed to 60,000 roentgens of X-ray irradiation. The blood was then inoculated via the jugular vein into a white-tailed deer. 500 ml. of blood from this inoculated deer was transfused into another deer twelve days later. A quantity of approximately 500 ml. of blood was then transferred from the second deer into a two-year-old ewe 15 days later. Thereafter, serial blood passages of quantities varying between 300 ml. and 700 ml. were made in 58 sheep in intervals between 14 and 30 days. Blood, in quantities varying between 5 ml. and 50 ml., from 12 different sheep passages were inoculated into corresponding number of splenectomized susceptible calves in order to: (1) establish the virulence of this organism for cattle and (2) ascertain the survival of Anaplasma marginale in sheep. The above 12 blood samples were taken from every fifth sheep, beginning with the second: i.e., the second, seventh, twelfth, seventeenth, twenty-second, twenty-seventh, thirty-second, thirty-seventh, forty-second, forty-seventh, fifty-second, and fifty-seventh sheep. It was found from these trials that the organism had lost at least some of its virulence for cattle as early as the second passage in sheep. Higher passage levels were even less virulent for cattle as evidenced by the survival of inoculated splenectomized calves and, moreover, the absence of clinical signs of the disease in these animals. It was furthermore demonstrated that the agent would survive in sheep, goats and deer; therefore vaccine could be produced from the blood of cattle, deer, sheep or goats. However, the use of cattle is not preferred because of the danger of introducing contaminants from the cattle host which might render the vaccine harmful to the cattle to be immunized.

The amount of radiation can be varied within wide limits. However, it has been found that an amount of radiation between 1,000 to 320,000 roentgens is particularly suitable for the purposes herein. However, the preferred range is 10,000 to 120,000 roentgens, especially 25,000 to 100,000 roentgens, e.g. 40,000 to 85,000 roentgens. The irradiation may be carried out by any conventional means. Thus, while X-rays are preferred, cobalt 60 or other deep penetrating gamma radiation can be used.

In the example above, 61 nonbovine animals were used for the serial passages of the irradiated organism which was first inoculated into a deer. However, the irradiated organism may be introduced into a sheep or a goat ab initio and the blood of the second sheep thus inoculated would contain the avirulent Anaplasma marginale mutant as shown above. There is no upper limit as to the number of serial passages to which the vaccine may be put through as vaccines from the blood of nonbovine animals after 160 passages are still effective.

EXAMPLE 2 PREPARATION OF VACCINES

Blood was harvested from the forty-seventh sheep of Example 1. This blood contained the attenuated Anaplasma marginale within the red blood cells. Heparin was added in a concentration of three units per ml of blood in order to prevent clotting. Other suitable anticoagulants such as sodium citrate have also been satisfactorily used. 100 ml of this blood (although other quantities can be used) was intravenously infused into each of sic Anaplasma marginale susceptible sheep. Establishment of the attenuated agent in these sheep after inoculation was confirmed by direct blood smear examination and a positive serologic reaction in the capillary tube agglutination test. Blood was harvested from each infected sheep, heparinized as previously described, and pooled. Such fresh whole blood containing attenuated Anaplasma marginale within the red blood cells can be used as vaccine without further treatment. However, in the present example the heparinized blood was divided into two equal batches and stabilized by 1 of 2 methods.

Method A:

Polyvinylpyrrolidone was added to the heparinized whole blood to a final concentration of 15 percent. The blood was then dispensed in five ml aliquots, frozen and lyophilized. The powdered vaccine was then stored at 4° to 5° until used.

Method B:

Glycerol was added to the heparinized whole blood to a final concentration of 20 percent. The blood was dispensed in five ml aliquots and frozen. The frozen vaccine was then stored at −60° C until used.

Lyophilized vaccine was reconstituted with five ml. of a sterile diluent, which in this case was sterile distilled water buffered to pH 7. Frozen vaccine was thawed by holding its container in the hand.

Vaccine has also been produced from blood of deer, cattle and goats which contain attenuated Anaplasma marginale within their red blood cells. Variations in vaccine production, e.g. purification of red blood cells containing the attenuated Anaplasma marginale prior to stabilization, are possible and it should be understood, that the detailed description and specific examples, while indicating preferred embodiments of the invention are given by way of illustration only, since various changes and modifications within the spirit and scope of the invention will become apparent to those skilled in the art.

Demonstration of Immunogenicity and Safety of the Attenuated Organism

EXAMPLE 3

15 cattle ranging from four to 14 years of age were selected to determine the immunogenicity of the attenuated Anaplasma organism. The susceptibility of these animals to infection with Anaplasma marginale was determined by examining their blood serum with the capillary tube agglutination (CA) and the complement fixation (CF) tests. In addition, blood samples from each animal stained by the Giemsa and acridine orange methods were microscopically examined. These results indicated that all of these animals were free of anaplasmosis. A group of six and another group of five of these animals were then each inoculated subcutaneously with ten ml. and five ml., respectively, using vaccine prepared from sheep blood according to the invention. The vaccine so used was from the forty-seventh sheep in Example 1. The attenuated organism harvested from the forty-seventh sheep is considered a preferred embodiment of the invention and this organism is on deposit at the American Type Culture Collection under ATCC Number VR 554, which deposit is freely available to the public. The remaining four animals were kept as a group for experimental control. All vaccinated animals became positive to the CA and the CF test approximately five to six weeks later. The percent parasitemia in these animals varied between three and 11 percent. An average hematocrit reduction of six percent with a 12 percent high and a two percent low was observed in these vaccinated animals. No clinical signs of anaplasmosis or any other abnormalities were noticed in any of the vaccinated animals. Each of the fifteen animals was challenged 72 days following vaccination with subcutaneous administration of 10 ml. of blood from a carrier of virulent Anaplasma marginale. During the three months of the observation period which followed the challenge, no clinical and hematologic abnormalities were observed in any of the vaccinated animals. On the other hand, the four animals of the control group succumbed to clinical anaplasmosis within five weeks of challenge. Three of these animals died and one made a slow recovery over the four months following challenge.

EXAMPLE 4

10 of 20 cattle two to six years of age were vaccinated with the attenuated Anaplasma marginale vaccine prepared as described above. The vaccine used here was taken from the fifty-fifth sheep in Example 1. All 20 cattle were then placed in a herd of 75 animals containing known Anaplasma marginale carriers. During the subsequent summer two of the ten nonvaccinated cattle became acutely sick with anaplasmosis. No symptoms of the disease were observed at any time in the vaccinated cattle. These data indicated the vaccine was effective in the face of natural challenge.

EXAMPLE 5

Eight susceptible Holstein cows, five or to six years of age, were inoculated intraveneously, subcutaneously or intramuscularly with five ml. to 150 ml. of vaccine prepared according to this invention. The vaccine used was from the fifty-second sheep in Example 1. A ninth cow received five ml. of blood containing virulent Anaplasma marginale.

| Cow No. | Inoculation & Route | Packed Cell Volume initial | Packed Cell Volume lowest | Peak of Parasitemia of Erythrocytes (%) |
|---|---|---|---|---|
| 1 | 50 ml. intravenously | 38 | 34 | 2 |
| 2 | 150 ml. intravenously | 34 | 14 | 25 |
| 3 | 5 ml. intravenously | 33 | 23 | 14 |
| 4 | 5 ml. subcutaneously | 37 | 32 | 11 |
| 5 | 5 ml. intravenously | 35 | 27 | 10 |
| 6 | 25 ml. subcutaneously | 31 | 18 | 16 |
| 7 | 75 ml. subcutaneously | 26 | 17 | 6 |
| 8 | 125 ml. subcutaneously | 28 | 17 | 18 |
| 9 | 5 ml. virulent Anaplasma marginale intravenously | 33 | 6 | 38 (died) |

All eight cows which received vaccine developed erthrocytic inclusions and a drop in packed cell volume without concurrent symptoms of the disease whereas, the one cow which received virulent Anaplasma marginal developed fever, anorexia, weight loss, a severe anemia and died. The agent was therefore demonstrated to be considerably attenuated since 150 ml. of vaccine administered intravenously did not result in gross symptoms of anaplasmosis. Vaccinated cows 3, 4 and 5 maintained high levels of antibody for at least six months at which time they were challenged with five ml. of blood containing virulent Anaplasma marginale. All three animals completely resisted this challenge.

EXAMPLE 6

In order to determine whether or not the attenuated strain of Anaplasma marginale would become virulent again it was serially passed in five cows, four to six years of age. The first cow received five ml. of sheep blood vaccine containing the attenuated agent. This sheep blood vaccine was from the forty-seventh sheep in Example 1. Each subpassage into another cow consisted of five ml. of blood and was carried out 60 to 114 days after inoculation. None of the cows exhibited clinical symptoms of anaplasmosis and all developed a strong immunity.

It was concluded that passage of the attenuated agent from one cow to another did not tend to make it virulent, at least for five serial passages. It was also concluded that the blood of the vaccinated cows may be used as vaccine. Such blood can be used as vaccine without further treatment or the blood may be treated as indicated in Example 2 to preserve and store the same for further use.

What is claimed is:

1. A method for the production of an anaplasmosis vaccine containing attenuated Anaplasma marginale organisms comprising:
    1. exposing blood with Anaplasma marginale organisms within parasitized red blood cells derived from a known infected bovine host to an effective quantum of radiation between 25,000 and 100,000 roentgens to accelerate the rate of dissociation of the virulent Anaplasma marginale organism;
    2. inoculating said radiated blood into anaplasmosis susceptible non-bovine ruminant sheep, goat or deer host;
    3. harvesting blood from said non-bovine ruminant host, said blood containing attenuated Anaplasma marginale
    4. serially inoculating with said harvested blood into each of a plurality of said hosts;
    5. continuing said serial inoculation until attenuated Anaplasma marginale organisms are confirmable in harvested blood by direct blood smear examination and a positive serologic reaction in the capillary tube agglutination test or complement fixation test; and
    6. harvesting the blood from said hosts with the confirmed attenuated Anaplasma marginale organisms of step 5;

whereby said blood of step 6 contains attenuated Anaplasma marginale within the red blood cells and is useful as vaccine, said vaccine being characterizable by at least one of the following tests:

a. an anaplasmosis susceptible ruminant host, vaccinated with said vaccine, becomes positive to capillary agglutination and complement fixation tests approximately five to six weeks after vaccination;
b. an anaplasmosis susceptible ruminant host, vaccinated with said vaccine, develops erythrocytic inclusions and shows a drop in packed cell volume, without concurrent gross symptoms of anaplasmosis;
c. an anaplasmosis susceptible ruminant host, vaccinated with said vaccine, maintains a high level of antibody for at least six months, at which time the host resist challenge with Anaplasma marginale;
d. an anaplasmosis susceptible ruminant host, vaccinated with said vaccine, remains free of observable symptoms of the anaplasmosis, in the face of a natural challenge when the host is placed in a herd of anaplasmosis susceptible ruminant hosts containing known Anaplasma marginale carriers;
e. said attenuated strain of Anaplasma marginale, which is on deposit in the American Type Culture Collection under ATCC Number VR 554, remains avirulent for at least five serial passages through anaplasmosis susceptible ruminant hosts and each host exhibits strong immunity to clinical symptoms of anaplasmosis; and
f. the blood of a vaccinated anaplasmosis susceptible reuminant host is useful as a vaccine for anaplasmosis without further treatment.

2. A method according to claim 1 wherein said radiation is X-ray.

3. A method according to claim 1 wherein said radiation is from a radioactive cobalt source.

4. A method according to claim 2 wherein said X-ray radiation is administered in a quantum about 60,000 roentgens.

5. The method of claim 1 including the step of storing the blood under preserving conditions.

6. The method of claim 5 in which the withdrawn blood is freeze-dried and the powder is stored.

7. The method of claim 5 in which the withdrawn blood is frozen and the frozen liquid is stored.

8. The method of claim 5 in which the preserving condition for the lyophilized vaccine is brought about by desiccating the vaccine in admixture with polyvinylpyrrolidone.

9. The method of claim 5 in which the preserving condition for the frozen vaccine is brought about by freezing the vaccine in admixture with glycerol.

10. A method of immunizing cattle against Anaplasma marginale comprising inoculating the cattle with at least one of: (1) the blood of step 6 of claim 29; (2) the blood of a cow which has been immunized directly with the blood of step 6 of claim 29; and (3) the blood of a cow which has been immunized with the said attenuated Anaplasma marginale organism.

11. A method according to claim 1 wherein the vaccine is harvested from a passage not earlier than the second animal passage.

12. A method according to claim 1 wherein the quantum is in a range from 40,000 to 85,000 roentgens.

13. The Anaplasma marginale vaccine comprising the blood of step 6 of claim 1.

14. The Anaplasma marginale vaccine comprising the blood of the said cows of claim 10.

* * * * *